(12) United States Patent
Woollard et al.

(10) Patent No.: US 8,794,430 B2
(45) Date of Patent: Aug. 5, 2014

(54) ASSEMBLY TO APPLY A FLAVOURING TO SNACK FOOD

(75) Inventors: David Beresford Woollard, Dorset (GB); Phillippa Ray Woollard, Dorset (GB)

(73) Assignee: TNA Australia Pty Limited, Lidcombe, New South Wales (AU)

( * ) Notice: Subject to any disclaimer, the term of this patent is extended or adjusted under 35 U.S.C. 154(b) by 59 days.

(21) Appl. No.: 13/488,311

(22) Filed: Jun. 4, 2012

(65) Prior Publication Data
US 2013/0001049 A1 Jan. 3, 2013

(30) Foreign Application Priority Data
Jun. 30, 2011 (AU) ................. 2011902602

(51) Int. Cl.
*B65G 27/06* (2006.01)
*B65G 27/16* (2006.01)
(52) U.S. Cl.
CPC ..................................... *B65G 27/16* (2013.01)
USPC ......................................... 198/758; 198/762
(58) Field of Classification Search
USPC .............. 198/752.1, 758, 759, 761, 762, 766, 198/769; 222/196
See application file for complete search history.

(56) References Cited

U.S. PATENT DOCUMENTS

| | | | | |
|---|---|---|---|---|
| 3,967,583 A | * | 7/1976 | Booth | 118/16 |
| 5,472,079 A | * | 12/1995 | Yagi et al. | 198/762 |
| 5,853,082 A | * | 12/1998 | Buckley et al. | 198/752.1 |
| 5,910,678 A | * | 6/1999 | Lou et al. | 257/529 |
| 6,465,932 B2 | * | 10/2002 | Yagi | 198/756 |
| 7,757,836 B2 | * | 7/2010 | Karpinsky et al. | 198/758 |
| 2003/0098220 A1 | * | 5/2003 | Kraus et al. | 198/758 |

FOREIGN PATENT DOCUMENTS

| | | |
|---|---|---|
| GB | 2397863 A | 8/2004 |
| JP | 2001165757 A | 6/2001 |

OTHER PUBLICATIONS

Search Report dated Sep. 14, 2012 in Application No. GB1208525.4.

* cited by examiner

*Primary Examiner* — James R Bidwell
(74) *Attorney, Agent, or Firm* — Kilpatrick Townsend & Stockton LLP

(57) ABSTRACT

A conveyor assembly to deliver flavoring to a conveyor upon which a product to be coated is conveyed. The flavoring is typically in granular form such as a powder. The assembly includes a conveyor including a longitudinally elongated tray that is vibrated by an actuator. The tray and actuator are adapted to distribute the flavoring transversely across the conveyor.

20 Claims, 4 Drawing Sheets

ASSEMBLY TO APPLY A FLAVOURING TO SNACK FOOD

This application claims priority to Australian Provisional Application No. 2011902602, filed Jun. 30, 2011, the entirety of which is incorporated by reference herein.

TECHNICAL FIELD

The present invention relates to conveyors that convey a flowable substance in granular (including powder) form, and more particularly but not exclusively to conveyors that deliver the flowable substance for the purposes of coating product on another conveyor to which the substance is delivered.

BACKGROUND OF THE INVENTION

In the snack food industry many snack foods are coated with a flavouring. There are machines that provide for the coating of the snack food, such as the machine described in U.S. Pat. No. 7,878,142.

A disadvantage of some previous machines is that they do not uniformly coat the snack food and/or have significant waste.

A further disadvantage of some previous machines is that they can be complex and therefore unreliable.

A still further disadvantage of some previous machines is that they are frequently difficult to clean.

Object of the Invention

It is the object of the present invention to overcome or substantially ameliorate at least one of the above disadvantages.

SUMMARY OF THE INVENTION

There is disclosed herein a conveyor assembly to deliver a flowable substance in granular form, said assembly including:

an elongated tray having a longitudinal axis and a floor provided to receive the substance, the floor sloping downward from a substance receiving portion to a substance delivery portion;

an actuator to cause vibration of the tray to cause the substance to travel along the floor from the receiving portion to the delivery portion at which the substance is delivered from the floor; and wherein said delivery portion includes an edge of the floor so the substance falls from the floor, and said actuator vibrates the floor at a frequency with an amplitude with a vertical component, with said frequency being at least 20,000 hz.

Preferably, the frequency is less than 70,000 hz.
Preferably, the frequency is 30,000 hz to 40,000 hz.
More preferably, the frequency is 36,000 hz to 38,000 hz.
Preferably, said amplitude has effectively a negligible horizontal component.
Preferably, said horizontal component is approximately zero.

There is still further disclosed herein a conveyor assembly to deliver a flowable substance in granular form, said assembly including:

an elongated tray having a longitudinal axis and a floor provided to receive the substance, the floor sloping downwardly from the substance receiving portion to a substance delivery portion;

an actuator to cause vibration of the tray to cause the substance to travel along the floor from the receiving portion to the delivery portion at which the substance is delivered from the floor; and wherein the floor at the delivery portion including an edge so that the substance falls from the floor, and said actuator vibrates the floor at a frequency with an amplitude extending generally perpendicular to said axis.

Preferably, said frequency is at least 20,000 hz.
Preferably, said frequency is less than 70,000 hz.
Preferably, the frequency is 30,000 hz to 40,000 hz.
More preferably, the frequency is 36,000 hz to 38,000 hz.
Preferably, the amplitude is 1 µm to 130 µm.
Preferably, the amplitude is 2.5 µm to 5 µm.
Preferably, the amplitude has affectively no component parallel to said axis.
Preferably, said amplitude has approximately zero component parallel to said axis.
Preferably, said actuator is attached to said tray by a coupling member, with said tray having a bottom surface to which the coupling member is directly attached.
Preferably, the tray and coupling member have a resonant frequency at approximately the frequency provided by the actuator.
Preferably, said edge is generally linear so as to have a direction of extension transverse of said axis and parallel to said axis.
Preferably, the edge has a length in the direction of extension parallel to said axis and a length in the direction transverse of said axis that is less than the length in the direction of extension parallel to said axis.
Preferably, the tray is inclined by 1° to 10° to the horizontal.
Preferably, the tray is inclined by 3° to 5° to the horizontal.

There is further disclosed herein, the above assembly and a further conveyor, and wherein said edge extends generally transverse of further conveyor so that the substance is spread transversely across the further conveyor.

BRIEF DESCRIPTION OF THE DRAWINGS

Preferred forms of the present invention will now be described by way of example with reference to the accompanying drawings wherein.

DETAILED DESCRIPTION OF THE PREFERRED EMBODIMENT

Figure 1:
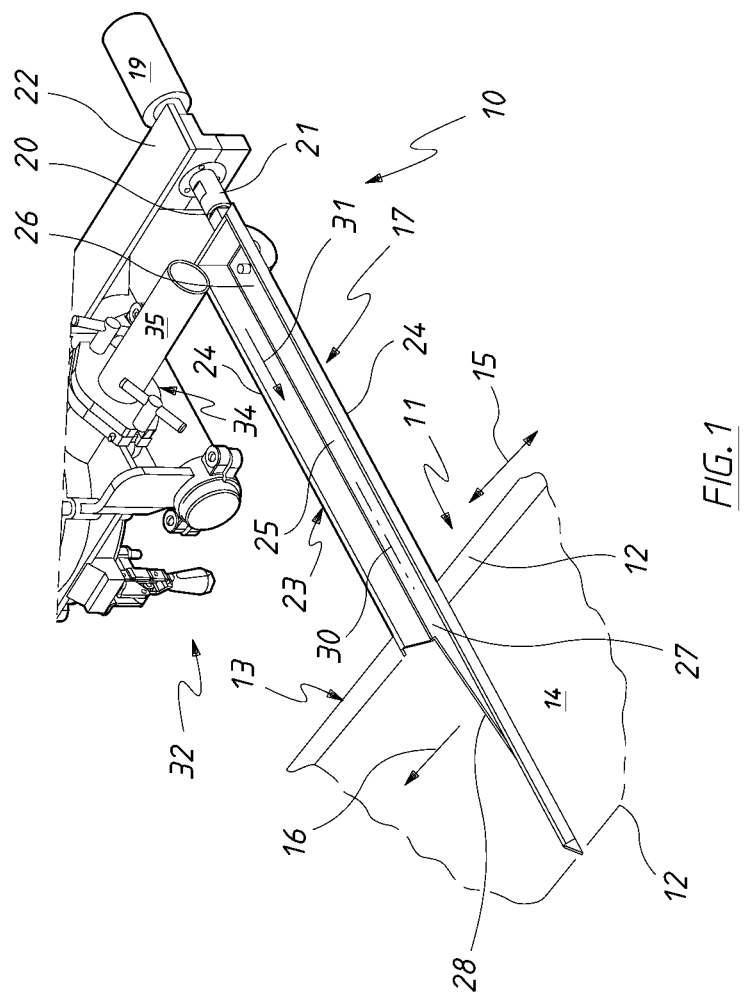
FIG. 1 is a schematic isometric view of portion of an assembly to deliver a flowable substance in granular form to a conveyor.
Figure 2:
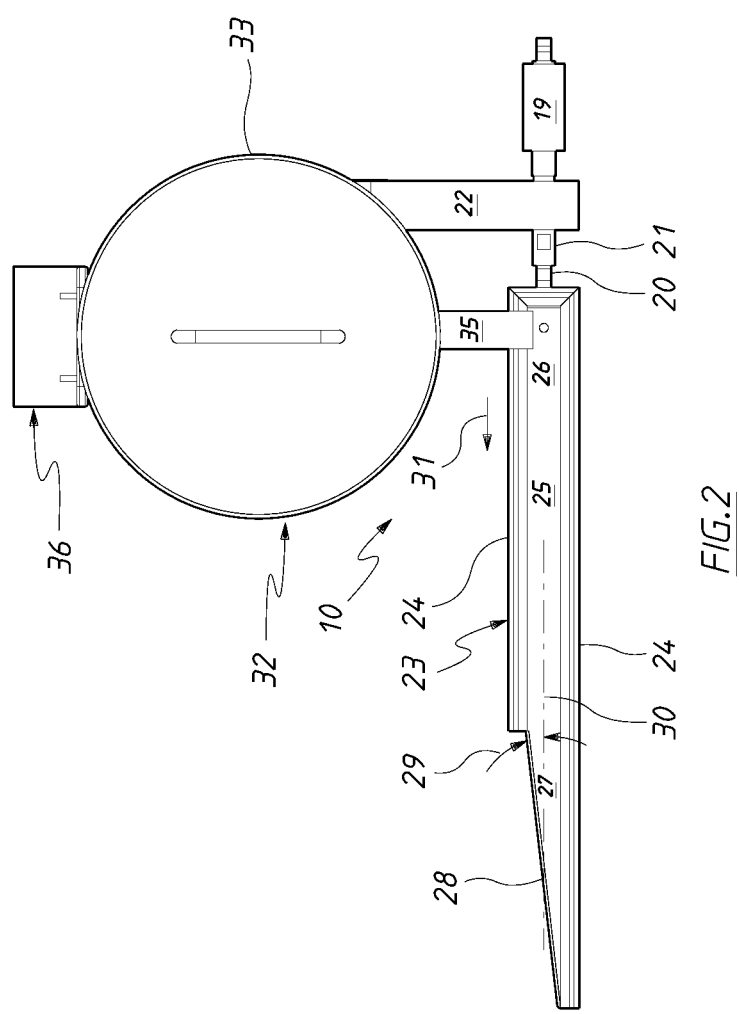
FIG. 2 is a schematic top plan view of the machine of FIG. 1.
Figure 3:
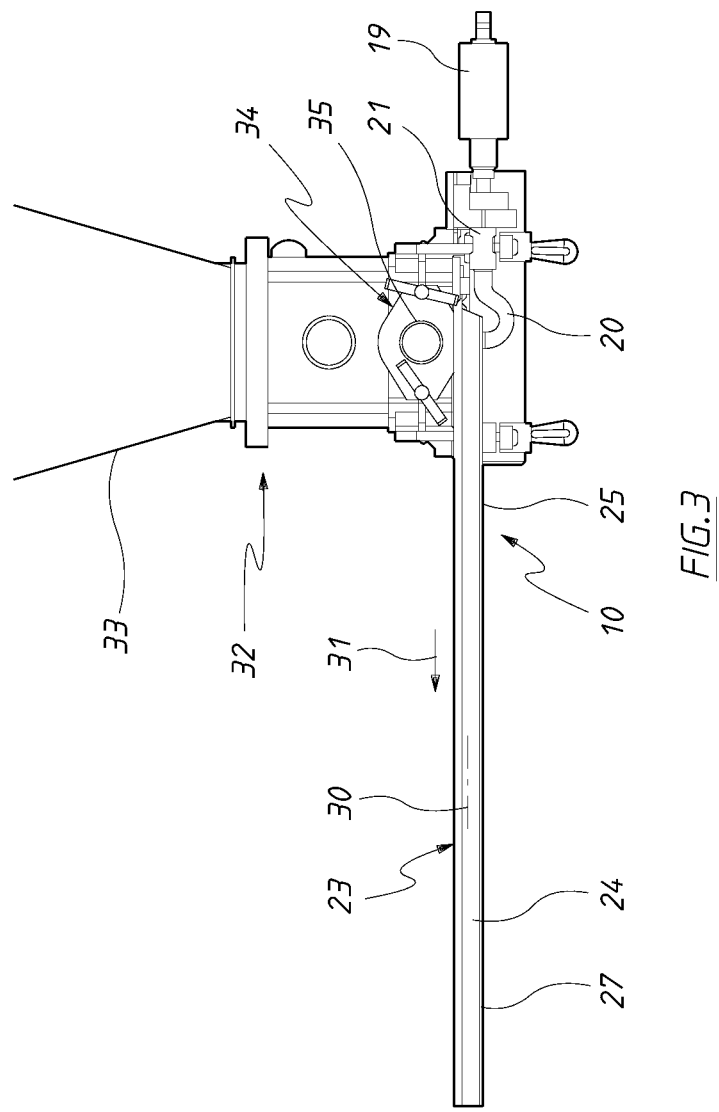
FIG. 3 is a schematic front elevation of the machine of FIG. 1.
Figure 4:
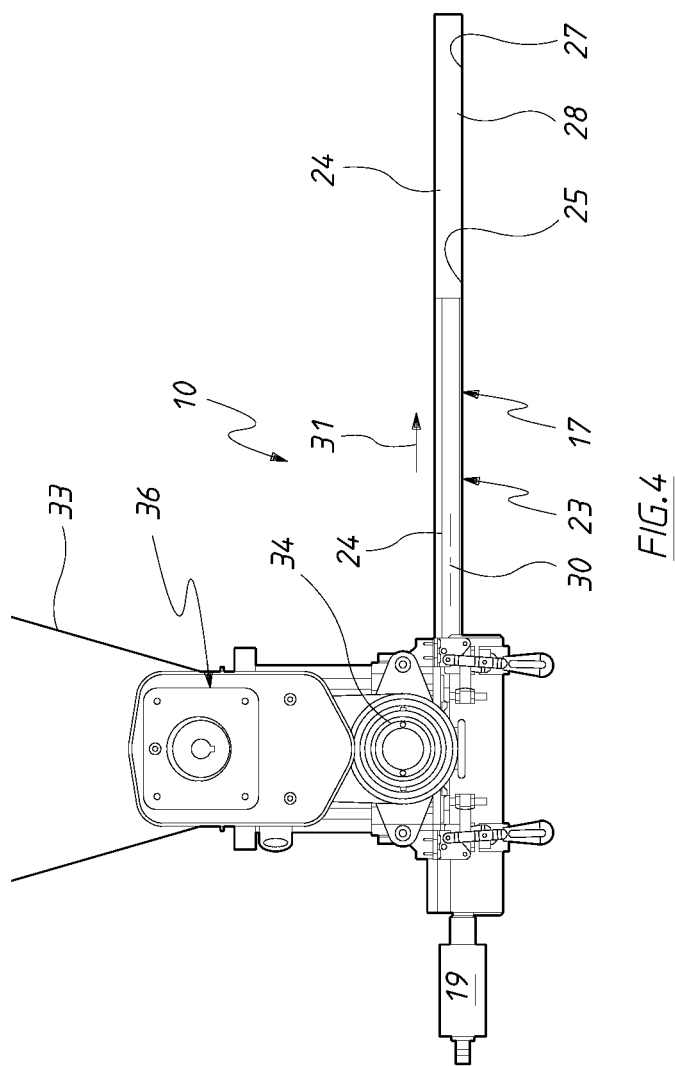
FIG. 4 is a schematic rear elevation of the machine of FIG. 1.

In the accompanying drawings there is schematically depicted a conveyor assembly 10. The assembly 10 delivers flavouring to a conveyor 11 upon which there is conveyed a product to be coated. The flavouring would be in granular forms, this includes the flavour being a powder. As a particular example, the assembly 10 may deliver a flavouring to a snack food being conveyed by the conveyor 11. Although many types of different conveyors may be employed, typically the conveyor 11 would be a slip conveyor having a longitudinally extending tray 13 that includes a pair of longitudinally extending side walls 12 between which a tray floor 14 extends. The tray 13 would be reciprocated in the direction 15 so as to convey product in the longitudinal direction 16. Typically the snack food would be distributed transversely across the tray 13.

The assembly 10 includes a conveyor 17 consisting of a longitudinally elongated tray 23 that is vibrated by an actuator 19. Preferably the actuator 19 is electrically operated and provides a vibration in the frequency range of 20,000 hz to 70,000 hz, most preferably about 36,000 hz to 38,000 hz. Supporting the tray 23 is a shaft 20 that is fixed to the tray 23. The shaft 20 is supported by a collar 21, with the collar 21 being mounted on a bracket 22. The actuator 19 is also mounted on the bracket 22 so as to be supported thereby.

The tray 23 includes a pair of longitudinally extending sides 24 between which there is located a longitudinally extending floor 25. The sides 24 extend upwardly from the tray floor 25. The shaft 20 is fixed to the bottom surface of the tray 23.

The actuator 19 vibrates the floor 25 so that the floor 25 has an amplitude with a vertical component, and most preferably with a vertical component and essentially negligible or zero horizontal component. In an alternative preferred from, the actuator 19 vibrates so as to vibrate the floor 25 so as to have an amplitude with a component perpendicular to the longitudinal axis 30, and most preferably with a component perpendicular to the axis 30 with essentially negligible or zero component parallel to the axis 30. When vibrated at the above frequency, the flavouring delivered to the tray 13 is essentially "fluidised". Preferably, the actuator 19 is a ultra high frequency (ultra-sonic frequency) "Sonotrode" actuator. Typically the actuator 19 would be a piezo electric motor with a vertical amplitude (or an amplitude perpendicular to the axis 30) of between 1.0 μm and 130 μm, preferably 2.5 μm to 5 μm.

Preferably, the floor 25 is inclined to the horizontal by an acute angle of 1° to 10°, preferably about 3° to 5°.

The tray 23 has a receiving portion 26 to which the flavouring is delivered, and a delivery portion 27. The delivery portion 27 includes an edge 28 of the floor 25, the edge 28 extending at an acute angle 29 to the longitudinally axis 30 of the tray 23. The edge 28 has a major direction of extension parallel to the axis 30 as well as a direction of extension in a lateral direction perpendicular to the axis 30 so as to be inclined by the angle 29. The length of the edge 28 is greater in the longitudinal direction than the length of the edge 28 in the lateral direction, i.e. the angle 29 is less than 45°.

Vibration of the tray 23 (floor 25) causes the flavour to travel in the direction 31 from the receiving portion 26 to the delivery portion 27 as the floor slopes downwardly at an acute angle from the receiving portion 26 to the delivery portion 27. Ultimately product passing along the tray 23 reaches the edge 28 at which time it falls from the edge 28 to be deposited on product on the floor 25 of the tray 13. The product is coated by the flavouring. As the edge 28 extends substantially across the entire width of the floor 25, product scattered across the floor 25 is coated.

Preferably, the direction 31 is generally perpendicular to the direction 16.

The flavour is delivered to the tray 23 from a flavour delivering assembly 32. The assembly 32 includes a hopper 33 that stores a volume of the flavouring in granular or powder form. The hopper 33 communicates with an auger assembly 34 that delivers the flavouring to a tube 35 via which the flavouring is delivered to the tray 23 at the delivery portion 26. The auger assembly 34 would include an auger that passes through the lower end of the hopper 33, or is in communication with the lower end of the hopper 33, with the auger being driven by a motor and gearbox assembly 36.

The invention claimed is:

1. A conveyor assembly to deliver a flowable substance in granular form, said assembly including:
    an elongated tray having a longitudinal axis and a floor provided to receive the substance, the floor sloping downward from a substance receiving portion to a substance delivery portion;
    an actuator to cause vibration of the tray to cause the substance to travel along the floor from the receiving portion to the delivery portion at which the substance is delivered from the floor; and wherein
    said delivery portion includes an edge of the floor so the substance falls from the floor, and said actuator vibrates the floor at a frequency with an amplitude with a vertical component, with said frequency being at least 20,000 Hz.

2. A conveyor assembly to deliver a flowable substance in granular form, said assembly including:
    an elongated tray having a longitudinal axis and a floor provided to receive the substance, the floor sloping downwardly from a substance receiving portion to a substance delivery portion;
    an actuator to cause vibration of the tray to cause the substance to travel along the floor from the receiving portion to the delivery portion at which the substance is delivered from the floor; and wherein
    the floor at the delivery portion includes an edge so that the substance falls from the floor, and said actuator vibrates the floor at a frequency with an amplitude extending generally perpendicular to said axis, wherein said frequency is at least 20,000 Hz.

3. The assembly of claim 1, wherein said frequency is less than 70,000 Hz.

4. The assembly of claim 3, wherein the frequency is 30,000 Hz to 40,000 Hz.

5. The assembly of claim 4, wherein the frequency is 36,000 Hz to 38,000 Hz.

6. The assembly of claim 1, wherein the amplitude is 1 μm to 130 μm.

7. The assembly of claim 6, wherein the amplitude is 2.5 μm to 5 μm.

8. The assembly of claim 1, wherein the amplitude has effectively no horizontal component.

9. The assembly of claim 2, wherein said amplitude has approximately zero component parallel to said axis.

10. The assembly of claim 1, wherein said actuator is attached to said tray by a coupling member, with said tray having a bottom surface to which the coupling member is directly attached.

11. The assembly of claim 1, wherein the tray and coupling member have a resonant frequency at approximately the frequency provided by the actuator.

12. The assembly of claim 1, wherein said edge is generally linear and has a direction of extension transverse to said axis, wherein the direction of extension comprises a first component parallel to said axis and a second component in a lateral direction perpendicular to said axis.

13. The assembly of claim 12, wherein the direction of extension defines an angle less than 45° with respect to the direction parallel to the axis such that the second component is less than the first component.

14. The assembly of claim 1, wherein the tray is inclined by 1° to 10° to the horizontal.

15. The assembly of claim 14, wherein the tray is inclined by 3° to 5° to the horizontal.

16. In combination the assembly of claim 1 and a further conveyor, and wherein said edge extends generally transverse of a longitudinal direction of the further conveyor so that the substance is spread transversely across the further conveyor.

17. The assembly of claim 2, wherein the frequency is 36,000 Hz to 38,000 Hz.

18. The assembly of claim 2, wherein the amplitude is 2.5 μm to 5 μm.

19. The assembly of claim 1, wherein the amplitude is 2.5 μm to 5 μm.

20. A conveyor assembly for conveying a substance, the assembly comprising:
- a tray, comprising:
    - a floor configured to convey the substance therealong in a downstream longitudinal direction of the tray, wherein the floor slopes downward in the downstream longitudinal direction, and wherein the floor comprises:
        - an upstream end; and
        - a downstream section defining an edge of the floor configured for the substance to fall from the edge and off the tray; and
- an actuator configured to vibrate the tray in a direction generally transverse to the longitudinal direction to thereby convey the substance along the floor in the downstream longitudinal direction.

\* \* \* \* \*